United States Patent [19]
Crispe

[11] 3,739,901
[45] June 19, 1973

[54] BISCUIT HANDLING MACHINERY
[75] Inventor: Stanley William Crispe, Liverpool, England
[73] Assignee: Simon-Vicars Limited, Lancashire, England
[22] Filed: Oct. 28, 1971
[21] Appl. No.: 193,261

[30] Foreign Application Priority Data
Nov. 12, 1970 Great Britain.................. 53,820/70

[52] U.S. Cl..................................... 198/30, 198/32
[51] Int. Cl............................................ B65g 47/26
[58] Field of Search................................ 198/30, 32

[56] References Cited
UNITED STATES PATENTS
2,753,975    7/1956    Day et al. ............................ 198/32
FOREIGN PATENTS OR APPLICATIONS
769,710    3/1957    Great Britain....................... 198/32

Primary Examiner—E. A. Sroka
Attorney—James E. Nolan

[57] ABSTRACT

Lane reducing means of the kind referred to comprising an inclined chute having side walls, the width of the chute tapering from at least the width of two biscuit lanes at its upper end to approximately the width of one biscuit lane at its lower end, characterized in that a raised biscuit supporting platform is provided over part of the surface of said chute on one side thereof, said platform extending from the wider end of the chute, where it is adapted to receive biscuits entering the chute from one of the lanes, to a position part way down the chute where the width of the latter is less than the width of two biscuits in side-by-side relationship, the height of said platform at its lower end above the surface of the chute being at least as great as the thickness of a biscuit to be traversed thereby.

10 Claims, 4 Drawing Figures

BISCUIT HANDLING MACHINERY

This invention relates to biscuit handling machinery and more particularly to means for reducing, preferably by half, the number of lanes in which biscuits travel in side-by-side relationship whilst being conveyed, for example, from an oven to an assembly of stacking rotors for stacking the biscuits ready for packing. Such means will be hereinafter termed "lane reducing means of the kind referred to."

If two adjacent lanes converge between guides to form a single lane, there is a danger that biscuits issuing from the two lanes can become jammed together between the guides.

The object of the present invention is to provide lane reducing means for biscuit handling machinery, in which the above mentioned danger is avoided or at least minimized.

According to the present invention, lane reducing means of the kind referred to comprises an inclined chute having side walls, the width of the chute tapering from at least the width of two biscuit lanes at its upper end to approximately the width of one biscuit lane at its lower end, characterized in that a raised biscuit supporting platform is provided over part of the surface of said chute on one side thereof, said platform extending from the wider end of the chute, where it is adapted to receive biscuits entering the chute from one of the lanes, to a position part way down the chute where the width of the latter is less than the width of two biscuits in side-by-side relationship, the height of said platform at its lower end above the surface of the chute being at least as great as the thickness of a biscuit to be traversed thereby.

The invention will be further apparent from the following description, with reference to the figures of the accompanying drawings which show, by way of example only, one lane reducing means embodying the invention.

Figure 1:
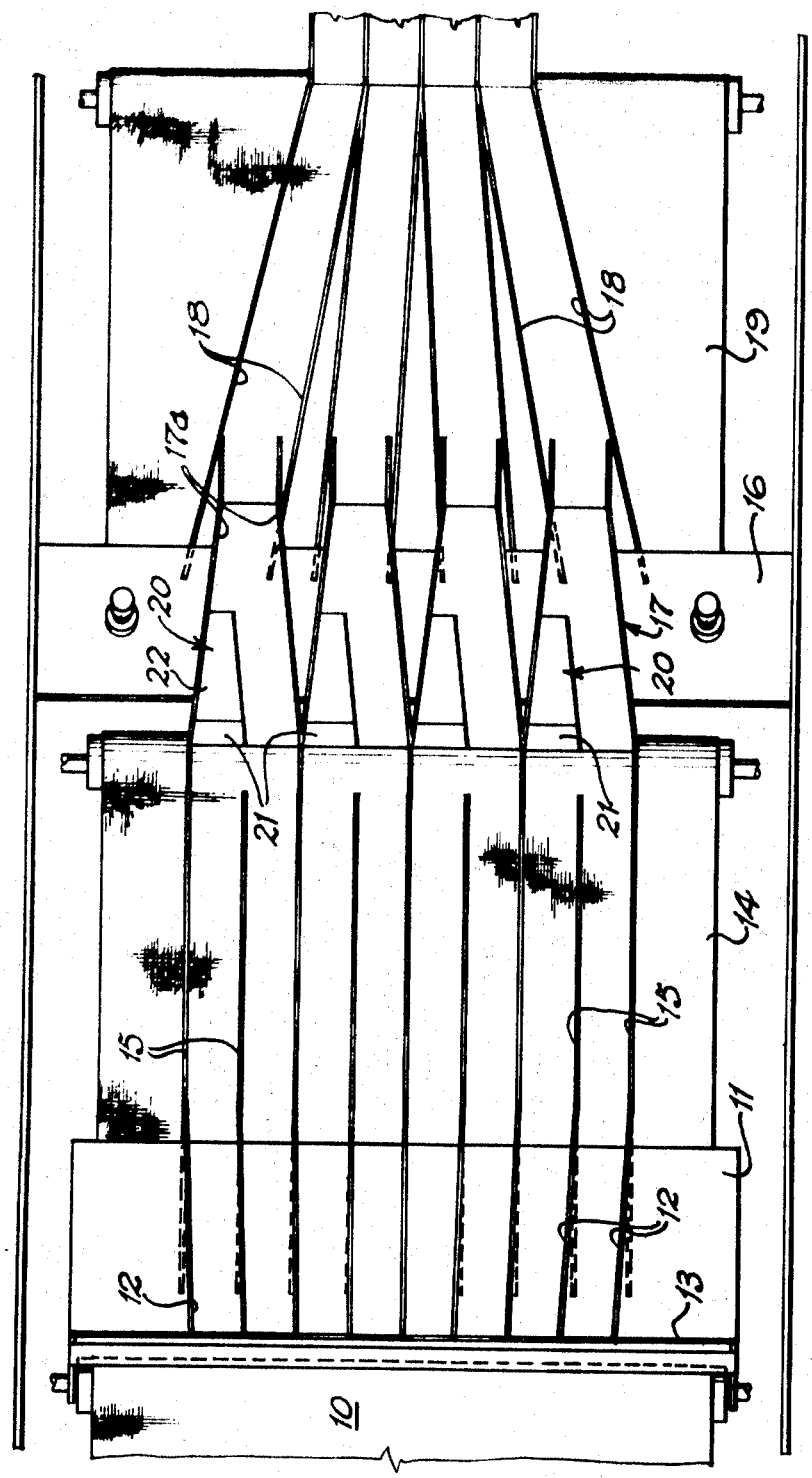
FIG. 1 is a schematic plan view of biscuit handling machinery including the lane reducing means.

In a biscuit handling machine, biscuits are fed on a conveyor belt 10 in side-by-side relationship, in rows, from an oven (not shown) to an inclined dribble board 11 where they are constrained to travel in lanes defined between guides 12. The latter are adjustable in position along a toothed bar 13 so as to accommodate differently sized and spaced biscuits.

The biscuits slide down the dribble board to be carried by a second conveyor belt 14 in lanes defined between further guides 15. At the end of the conveyor 14 is a further inclined board 16 on which are mounted a plurality of lane reducing chutes 17, having side walls 17a (see FIG. 2), the wider end of each chute being disposed at the outlet end of two adjacent lanes of the conveyor 14.

Each chute 17 tapers from approximately the width of two biscuit lanes to approximately the width of one such lane so that the number of lanes is reduced by a factor of two. The thus reduced number of lanes converge between guides 18 on a third conveyor belt 19 which carries the biscuits towards an assembly of stacking rotors (not shown) for positioning the biscuits for packing. The speed at which the belt 19 is driven is greater than that of the belt 14 to compensate for the reduction in the number of lanes along which the biscuits travel.

Figure 2:
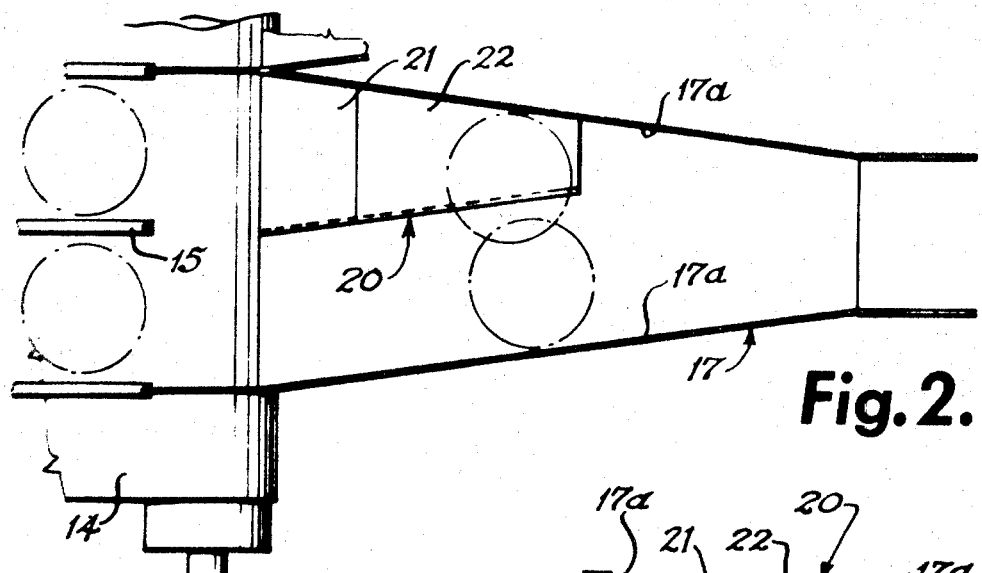
FIG. 2 is a detailed plan view of the lane reducing means on an enlarged scale.
Figure 4:
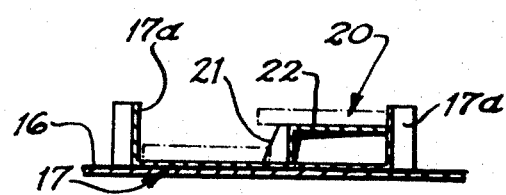
FIG. 4 is a section taken along line IV—IV of FIG. 3.
Figure 3:
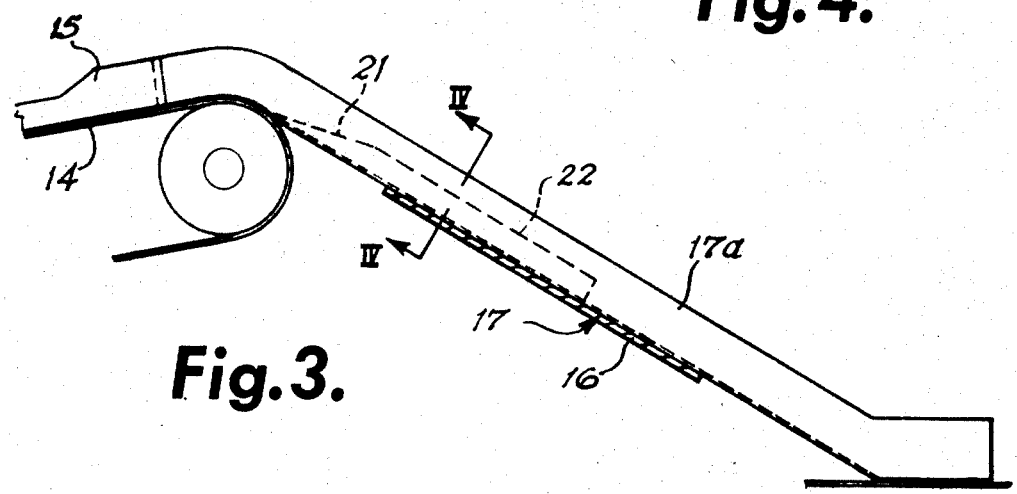
FIG. 3 is an elevation of the lane reducing means of FIG. 2.

Referring particularly to FIGS. 2, 3 and 4, it will be seen that in each chute 17 is mounted on one side thereof a raised tapered platform 20 having a portion 21 serving as a ramp, and a portion 22 parallel to the surface of the chute 17. The wider end of the platform 20 is located at the wider end of the chute 17 and is adapted to receive biscuits from one only of the lanes entering the chute. The platform extends down the chute to a position where the width of the chute 17 is less than twice the width of two biscuits disposed in side-by-side relationship. The height of the platform portion 22 above the surface of the chute 17 is slightly greater than the thickness of a biscuit to be handled.

In use therefore, if two biscuits issue from the conveyor 14 in side-by-side relationship as shown by chain dotted lines in FIG. 2, the biscuit from one lane rises up the ramp 21 and runs along the platform 20 whilst the other biscuit runs down the chute 17. The guide walls 17a cause the biscuits to be constrained into one lane at the narrower end of the chute. By the time the first mentioned biscuit leaves the platform 20 it cannot become jammed with the other biscuit owing to the width of the chute at that point. Therefore the biscuits will always slide to the lower end of the chute 17 without becoming jammed.

The biscuit lanes have been shown in FIG. 1, for the sake of simplicity, to be reduced in number from eight to four. It is more usual for sixteen or more lanes to be provided on the conveyor belt 14.

It will be appreciated that it is not intended to limit the invention to the above example only, many variations, such as might readily occur to one skilled in the art being possible without departing from the scope of the appended claims.

What is claimed is:

1. Lane reducing means of the kind referred to comprising an inclined chute having a bottom surface and opposite side walls, the width of the chute tapering from at least the width of two biscuit lanes at its upper end to approximately the width of one biscuit lane at its lower end, characterized in that a raised biscuit supporting platform is provided over part of the surface of said chute on one side thereof, said platform extending from the wider end of the chute, where it is adapted to slidably receive biscuits entering the chute from one of the lanes, to a position part way down the chute where the width of the latter is less than the width of two biscuits in side-by-side relationship, said chute surface at the same time being adapted to receive biscuits from the other lane where they slide directly down the chute surface at the other side from said platform, and the height of said platform at its lower end above the surface of the chute being at least as great as the thickness of a biscuit to be traversed thereby.

2. Lane reducing means according to claim 1, wherein said platform extends inwardly from one side wall of said chute.

3. Lane reducing means according to claim 2, wherein said platform tapers in width from its upper end, each edge thereof being parallel with the adjacent side wall of the chute.

4. Lane reducing means according to claim 1, wherein said platform comprises a ramp which is inclined relative to the surface of the chute, and a portion which is parallel to the surface of said chute.

5. Lane reducing means according to claim 3, wherein said platform comprises a ramp which is inclined relative to the surface of the chute, and a portion which is parallel to the surface of said chute.

6. Biscuit handling machinery having lane reducing means according to claim 1, including a first conveyor for carrying biscuits in lanes in side-by-side relationship, toward one or more lane reducing chutes whereby the number of lanes of biscuits is reduced, and a second conveyor for carrying the biscuits in said reduced number of lanes from said lane reducing chute or chutes.

7. Biscuit handling machinery according to claim 6, in which parallel lane guides are disposed above said first conveyor, and converging lane guides are disposed above said second conveyor.

8. Biscuit handling machinery according to claim 7, wherein the number of lane reducing chutes is such as to reduce the total number of lanes by half.

9. Biscuit handling machinery according to claim 6, including an inclined dribble board disposed at the upstream end of said first conveyor and having adjustable guides thereon for directing biscuits in side-by-side relationship onto said first conveyor.

10. Biscuit handling machinery according to claim 6, wherein said second conveyor is, in use, driven at a greater speed than said first conveyor.

* * * * *